US007301478B1

(12) United States Patent
Chinn et al.

(10) Patent No.: US 7,301,478 B1
(45) Date of Patent: Nov. 27, 2007

(54) VEHICLE SAFETY WARNING DEVICE

(75) Inventors: Gregory F. Chinn, Merritt Island, FL (US); Michael Laughead, Hollywood, FL (US); John Toman, Balwin, MO (US)

(73) Assignee: Overland Safety Technologies Corporation, Hollywood, CA (US)

( * ) Notice: Subject to any disclaimer, the term of this patent is extended or adjusted under 35 U.S.C. 154(b) by 147 days.

(21) Appl. No.: 11/367,994

(22) Filed: Mar. 3, 2006

(51) Int. Cl.
*G08B 19/02* (2006.01)
*B60Q 1/26* (2006.01)
*B60Q 1/52* (2006.01)
*G08G 1/00* (2006.01)
*G08G 1/09* (2006.01)
*G06F 7/00* (2006.01)
*G06F 17/10* (2006.01)

(52) U.S. Cl. .................. 340/905; 340/580; 340/581; 340/582; 340/583; 340/435; 340/463; 340/468; 340/471; 340/901; 340/905; 340/995.13; 340/962; 701/79; 701/300; 701/301; 701/302

(58) Field of Classification Search ........ 340/435–436, 340/580–585, 463–479, 901, 905, 962, 995.13; 701/79, 300–302
See application file for complete search history.

(56) References Cited

U.S. PATENT DOCUMENTS

| 4,222,044 A | * | 9/1980 | Boschung | 340/581 |
| 4,223,649 A | | 9/1980 | Robinson et al. | 123/319 |
| 4,418,331 A | | 11/1983 | Chicoine | 340/72 |
| 4,492,952 A | * | 1/1985 | Miller | 340/439 |
| 4,757,301 A | | 7/1988 | Neale, Jr. | 340/71 |
| 4,823,109 A | | 4/1989 | Boyer | 340/467 |
| 5,416,476 A | * | 5/1995 | Rendon | 340/905 |
| 5,426,418 A | | 6/1995 | Furgeson et al. | 340/479 |
| 5,504,472 A | | 4/1996 | Wilson | 340/479 |
| 5,619,193 A | * | 4/1997 | Doherty et al. | 340/905 |
| 5,745,051 A | * | 4/1998 | Doherty et al. | 340/905 |
| 5,818,339 A | * | 10/1998 | Giles et al. | 340/583 |
| 6,020,814 A | * | 2/2000 | Robert | 340/467 |
| 6,137,401 A | | 10/2000 | Barrows | 340/479 |
| 6,166,645 A | * | 12/2000 | Blaney | 340/583 |
| 6,166,657 A | * | 12/2000 | Mann | 340/905 |
| 6,185,495 B1 | | 2/2001 | Bäuerie | 701/70 |
| 6,239,696 B1 | | 5/2001 | Berger et al. | 340/463 |
| 6,326,888 B1 | * | 12/2001 | Wang | 340/463 |

(Continued)

*Primary Examiner*—Benjamin C. Lee
*Assistant Examiner*—Lam Pham
(74) *Attorney, Agent, or Firm*—Brian S. Steinberger; Phyllis K. Wood; Law Offices of Brian S. Steinberger, P.A.

(57) ABSTRACT

Apparatus, methods, system and devices for monitoring road surface temperature to detect hazardous road surface conditions. An indicator provides the sensed road surface temperature and hazardous road condition warning to a driver while a tail light interface automatically produce a tail light signal to warn drivers traveling behind the vehicle when a hazardous condition is detected. In an embodiment, the system includes a vehicle engine retardation system interfaced with the hazardous road condition warning system. When the retardation system is in use and hazardous road surface conditions are detected the controller automatically produces the brake light signal unless a tail light control switch is used to manually deactivating the automatic tail light flashing signal when the vehicle is traveling in a state that does not allow alternative control of the brake lights.

9 Claims, 8 Drawing Sheets

U.S. PATENT DOCUMENTS

| | | | |
|---|---|---|---|
| 6,690,291 B1 | 2/2004 | Cardillo et al. | 340/901 |
| 6,819,234 B1 | 11/2004 | Bunker et al. | 340/471 |
| 7,057,501 B1 * | 6/2006 | Davis | 340/435 |
| 7,107,138 B2 * | 9/2006 | Currie | 701/79 |
| 2005/0007246 A1 | 1/2005 | Yen et al. | 340/471 |

* cited by examiner

VEHICLE SAFETY WARNING DEVICE

FIELD OF THE INVENTION

This invention relates to motor vehicle braking devices and, in particular, to methods, systems, apparatus and devices for monitoring environmental conditions and the motor brake retarders and illuminating the brake lights in response to the monitored environment.

BACKGROUND AND PRIOR ART

In most jurisdictions across North America laws have been enacted making it mandatory for a motor vehicle to be equipped with rear brake lights connected to a pedal activated brake. The brake lights are illuminated upon activation of the pedal activated brake. When one motor vehicle is following another, the illumination of the lights of the lead vehicle provides a driver of the following motor vehicle with warning that the lead vehicle is decelerating.

Most large trucks have an auxiliary braking system known as a retardation system. The retardation system is used to slow the vehicle down. The driver does not need to activate the pedal activated brake in order to activate the retarder. As a consequence, the brake lights are not illuminated.

Retarders, designed as a means of supplementing the service brakes on long, steep downgrades, are found almost exclusively on diesel-powered medium and heavy trucks. You won't find a retarder on your car or pickup truck, primarily because of cost, vehicle gross weight, and the fact that gasoline engines don't "freewheel" as easily as diesel engines. Recent reductions in aerodynamic drag and rolling resistance in newer trucks have put increased strain on the service brakes, making retarders even more important than in the past.

The most common type of retarder is the engine brake. The engine brake harnesses the high compression ratio of a diesel engine to decelerate the truck. The engine becomes an air compressor, powered by the wheels, with braking energy dissipated in the engine and exhaust system instead of in the service brakes. The release of compressed air causes the characteristic roar of an engine brake.

U.S. Pat. No. 4,223,649 issued on Sep. 23, 1980 discloses a motor brake control system for use in motor vehicles having a motor brake retarder and a throttle fuel control that is designed to respond to manual selection for sequentially retarding the selected cylinders in the motor. The brake control system is activated when the motor exceeds a predetermined high RPM value to fully brake the vehicle.

U.S. Pat. No. 4,418,331 issued on Nov. 29, 1983 discloses a manually operated de-acceleration warning system with vacuum controlled override. The system includes a relay between a control loop containing a driver controlled switch and an operating loop for activating brake lights. The relay bypasses the brake pedal switch during downshift de-acceleration for manually flashing the lights. The system is held in a disable mode except during down shift de-acceleration.

U.S. Pat. No. 4,757,301 issued on Jul. 12, 1988 discloses a light pre-warning system for diesel vehicles. The engine brake warning system is connected to the rear of the vehicle in the general area of the brake lights. The lights are hardwired to the engine brake housings to activate according to selected phases of engine braking from the three position switch operated by the driver of the vehicle.

U.S. Pat. No. 4,823,109 issued on Apr. 18, 1989 disclose another warning light system for a vehicle powered by an engine employing an engine brake. The warning system takes a signal from an electrical control line associated with the engine brake and uses the signal to initiate a time delay. After the time delay, a switch is activated, turning on a warning light to warn drivers of other vehicles of the deceleration of the vehicle equipped with the warning light system.

U.S. Pat. No. 5,504,472 issued to Wilson on Apr. 2, 1996 disclose a vehicle deceleration warning light that includes a pressure switch in fluid communication with the master hydraulic brake cylinder. When the pressure reaches a predetermined level that is representative of panic or emergency braking, the pressure switch activates a delayed and latched switch that, after a suitable interval, turns on a contrastingly colored flashing warning indicator on the rear deck of the motor vehicle to warn a following driver of the rapid deceleration. The flashing indicator continues its flashing for a predetermined amount of time, even after the pressure on the pedal has been released.

U.S. Pat. No. 6,137,401 issued to Barrows on Oct. 24, 2000 disclose an engine brake indicator system for use with a vehicular accessory power source and a pair of brake lights mounted on a rear of a vehicle. The system included is an engine brake, a stage switch, and an engine brake master switch with different orientations when the engine brake is not employed and when the engine brake is employed. In use, the brake lights are actuated when the engine brakes are employed, indicted by the orientation of master switch. An engine brake indicator system is provided for use with a vehicular accessory power source and a pair of brake lights mounted on a rear of a vehicle. Included is an engine brake having a plurality of engine brake coils, a stage switch, and an engine brake master switch with a first orientation upon the engine brake being unemployed and a second orientation upon the engine brake being employed. In use, the engine brake master switch is connected between the power source and the brake lights for actuating the brake lights only upon being in the second orientation.

U.S. Pat. No. 6,185,495 issued to Bauerieon Feb. 26, 2001 disclose a system for generating a signal which represents a deceleration operation of a motor vehicle. With the system, a relatively precise index for a vehicle deceleration is obtained from the data present anyway in the motor control apparatus at least in newer or future motor control apparatus. If a drive of the brake lamps takes place in dependence upon the signal generated in accordance with the invention, then the traffic following is also made aware of the decelerations which are not directly attributable to an actuation of a brake.

U.S. Pat. No. 6,426,418 issued to Yen et al. On Jan. 13, 2005 disclose a system in a motor vehicle having a hazard warning light and a manual control switch, an improvement consisting of electronic circuitry which causes the hazard warning lights to automatically activate under circumstances of an engine stall and to remain activated until manually reset by the vehicle operator.

U.S. Pat. No. 6,819,234 issued to Bunker et al. on Nov. 16, 2004 discloses a method and system for providing an audible warning of approach of a moving vehicle that is undergoing hard braking. When hard braking is being applied and the initial vehicle velocity (just before hard braking is first applied) is at least equal to a selected threshold velocity, an artificially produced warning sound, resembling the screech or howl of one or more tires in a panic stop, is transmitted, in one or more selected angular sectors. If the initial vehicle velocity is less than the threshold velocity, the warning sound is witheld. The threshold velocity may depend upon one or more of initial velocity, initial deceleration, local road surface conditions and local weather conditions.

U.S. Pat. No. 5,426,418 issued to Furgeson et al. on Jun. 20, 1995 discloses a brake light configuration for a truck having an engine brake which includes the engine brake, a pedal activated brake, a power source and brake lights. A power source and the pedal activated brake are connected with the brake lights so the brake lights illuminate when the brake is activated or alternatively, upon operation of the engine brake. This system is intended to prevent accidents occurring in which motor vehicles drive into the rear end of trucks that have slowed down using their engine brake.

However, a vehicle moving on a road that includes water, snow, ice, gravel, mud, dirt or similar substances, is brought to a sudden stop, this vehicle often skids to a stop without making a sound that might warn others about the sudden braking.

While prior art addresses the issue of warning other drives of deceleration when engine brakes are used, the prior art fails to provide apparatus, methods, system and devices that detect hazardous road conditions based on road surface temperature and warn the driver of the hazardous condition and warn the driver traveling behind the vehicle.

SUMMARY OF THE INVENTION

A primary objective of the invention is to provide new methods, systems, apparatus and devices to provide a warning to the driver when road conditions are hazardous due to temperature.

A secondary objective of the invention is to provide new methods, systems, apparatus and devices for use with vehicle retardation system to alert drivers when hazardous road conditions are detected.

A third objective of the invention is to provide new methods, systems, apparatus and devices for use with retardation systems to automatically produce a brake light signal for illuminating the tail lights when a hazardous road condition is detected and retardation system use is detected.

A fourth objective of the invention is to provide new methods, systems, apparatus and devices for providing a system including voice recognition to allow the driver to request road condition status without taking his eyes off the road.

A fifth objective of the invention is to provide new methods, systems, apparatus and devices for providing a display screen for displaying road surface conditions and controls to allow the driver to activate and deactivate warning systems functions.

A first preferred embodiment of the invention provides a system for providing hazardous road condition warning. The system includes a temperature sensor for sensing a road surface temperature and a controller interfaced with the temperature sensors for receiving the sensed road surface temperature to detect a hazardous road condition. An indicator interfaced with the controller provides the sensed road surface temperature and hazardous road condition warning to a driver while a tail light interface allows the controller to automatically produce a tail light signal for illuminating a vehicle tail light to warn drivers traveling behind the vehicle when a hazardous condition is detected and the engine retarder is engaged.

In a second embodiment, the system is used with a vehicle engine retardation system interfaced with the hazardous road condition warning system controller to display retardation system activity to the driver. When the retardation system is in use and hazardous road surface conditions are detected the controller automatically produces the brake light signal unless a tail light control switch is used to manually deactivating the automatic tail light illumination when the vehicle is traveling in a state that does not allow alternative control of the brake lights.

The third embodiment provides a method for warning a driver of hazardous road conditions by monitoring a road surface temperature and providing the road surface temperature to the driver. The road surface temperature is analyzed to detect a hazardous road surface condition the driver is alerted when the hazardous road surface condition is detected. Optionally, the ambient air temperature is also monitored and analyzed with the road surface temperature to determine the severity of the road condition.

Further objects and advantages of this invention will be apparent from the following detailed description of preferred embodiments which are illustrated schematically in the accompanying drawings.

DESCRIPTION OF THE PREFERRED EMBODIMENTS

Figure 1:
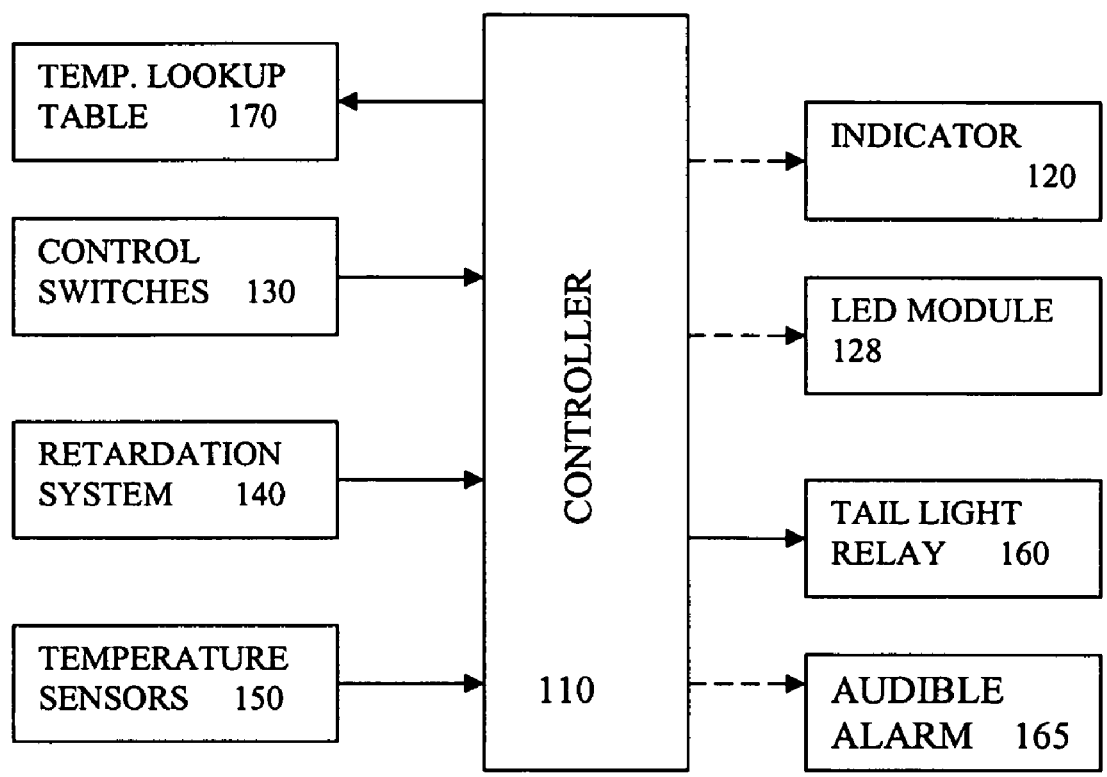
FIG. 1 is a block diagram of a vehicle hazard warning system to provide a warning for unsafe road conditions.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | vehicle warning system |
| 110 | controller |
| 120 | indicator |
| 122 | display screen |
| 124 | road temperature barograph |
| 126 | outside temperature barograph |
| 128 | LED module |
| 130 | controls |
| 138 | brake light switch |
| 140 | retarder data |
| 150 | temperature sensors |
| 160 | brake light relay |
| 165 | audible alarm |
| 170 | temperature lookup table |

Figure 2:
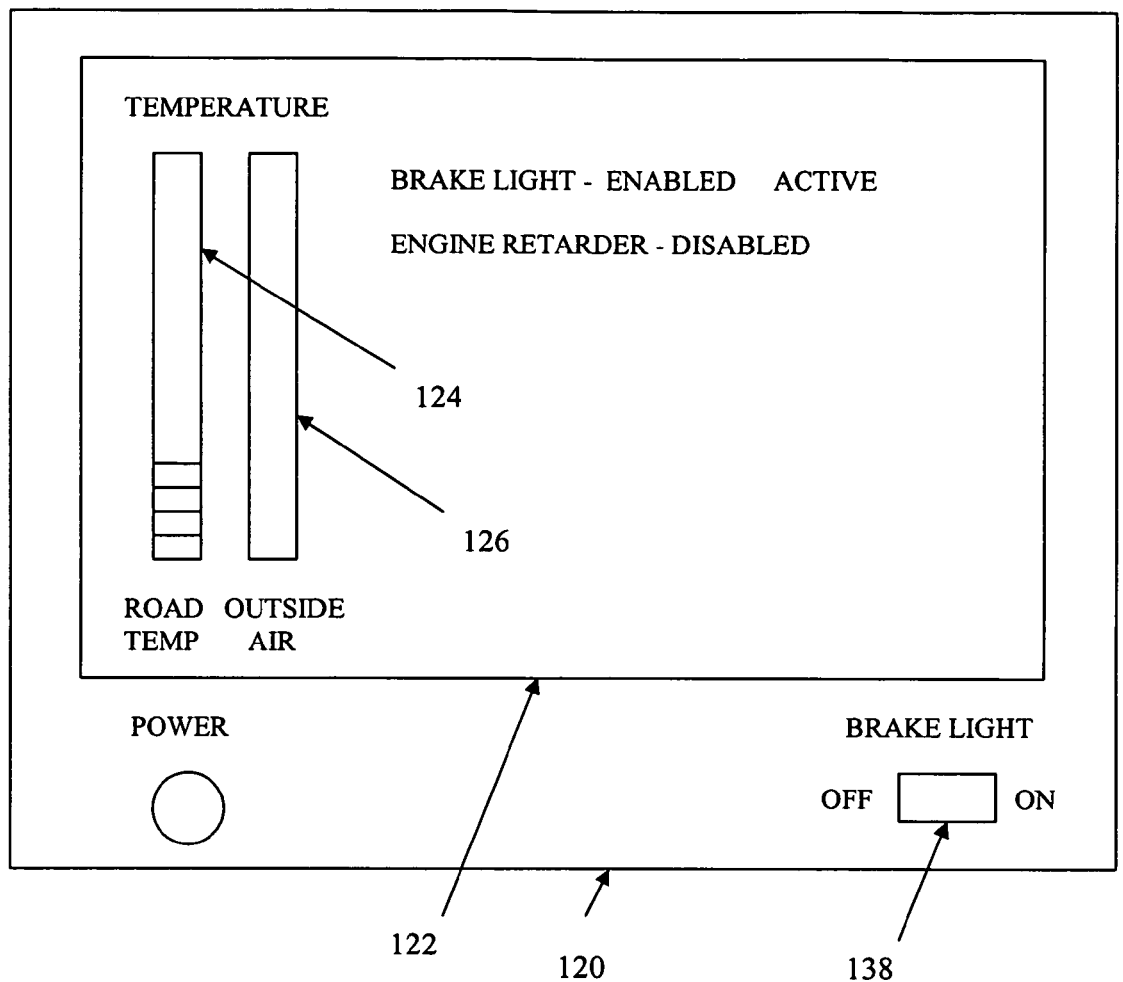
FIG. 2 shows an example of the vehicle hazard warning system according to the present invention.

FIG. 1 is a block diagram of a vehicle hazard warning system 100 to provide a warning for hazardous road conditions due to cold temperature. The vehicle warning system 100 of the present invention includes a microprocessor-based controller 110 that provides useful data to the driver of a vehicle. In an embodiment, the vehicle is a tractor-trailer type vehicle equipped with an engine retardation system. A basic function of the system 100 is to monitor at least one of the surface temperature of the roadway and the ambient air temperature using temperature sensors 150. The temperature data may be displayed to the driver via an LED module that provides the driver with a barograph representing the temperature. A temperature look-up table 170 is used by the controller to correlate the detected temperature data to road safety condition. Alternatively, the system includes a display screen 122 for displaying vehicle operational conditions and warnings and provides control switches 130 to allow the driver to manually activate warning system as shown in FIG. 2. The controller 110 includes an input port for receiving retardation system data 140 and a tail light relay 160 interface for automatically activating, deactivating or flashing the vehicle tail lights.

Figure 3:
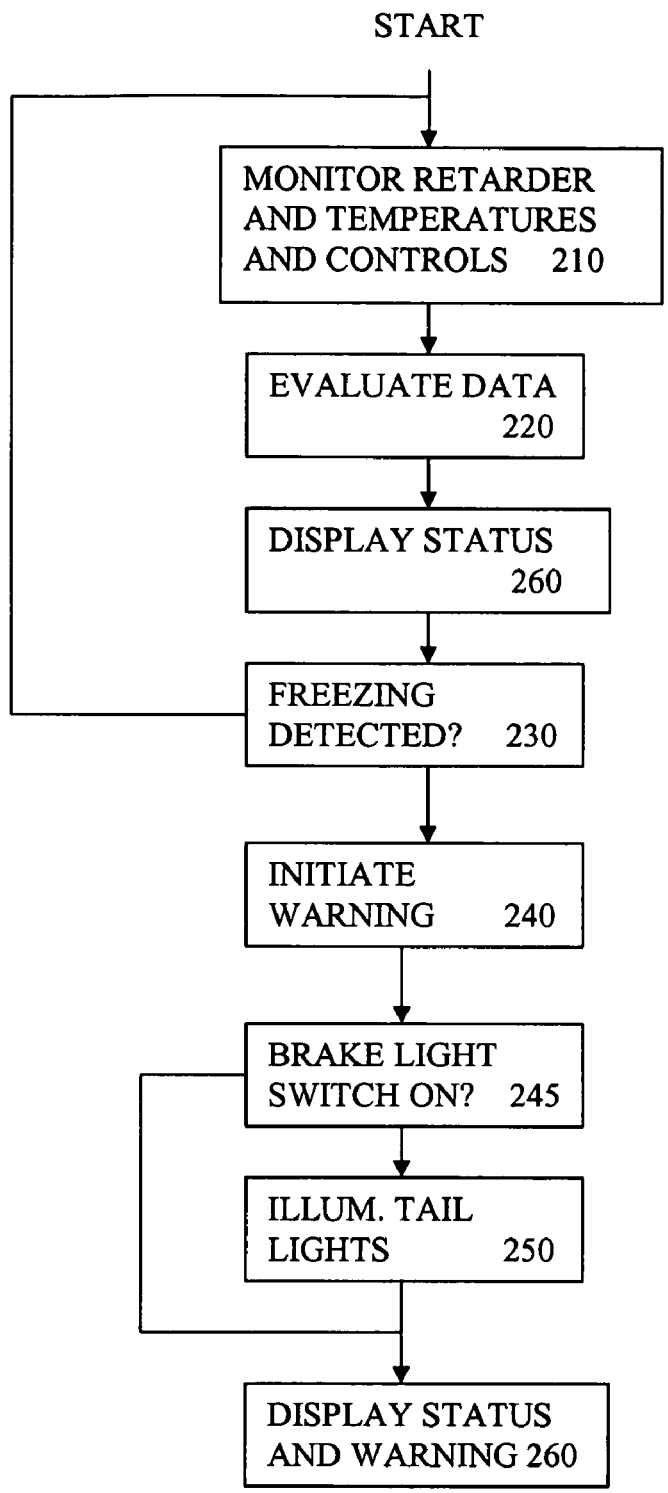
FIG. 3 is a flow diagram of the operation of the vehicle hazard warning system according to the present invention.

FIG. 3 is a flow diagram 200 of the operation of the vehicle warning system 100 according to an embodiment of the present invention. The system monitors the engine retarding system and the ambient air temperature in step 210 and evaluates the data in step 220. In the event the system detects a possible road icing condition in step 230 the system alerts the driver of the hazardous road condition due to temperature. For example, in a preferred embodiment if the temperature is approximately freezing, the system initiates a level-1 warning 240 to the driver. If the conditions further degrade to a point where surface temperature is below freezing, a level-2 warning is initiated. If the surface temperature and is low enough to where road salt is no longer effective, and the ambient air temperature is below freezing, a level-3 warning is initiated to alert the driver to a very dangerous condition.

In states where legal, the device will also monitor the engine retarding system in step 210 for activity. When the device detects that the engine retarder is in use, it will evaluate the road surface conditions in step 220 and apply the brake light signals in step 250 as needed. The time delay of the system depends on how critical the warning is to drivers behind the truck. Some states regulate the use of automatic systems for activating brake lights. If the operation of vehicle brake lights by the system is illegal in a particular state, the driver need only turn the brake light switch 138 to the "OFF" position. In the preferred embodiment, the warning system 100 continues to monitor the retarder system's functions in step 210, and updates the display screen. However, if the brake light switch is in the off position, the system does not apply the signal to the tail light relay 160 in step 250 to illuminate the tail lights.

In an embodiment, the display screen 122 is a multi-function display that provides information to the driver in regard to the road surface conditions, retarder function, and shows whether or not the tail light relay function is ON or OFF. The barograph temperature reading 124 and 126 are displayed on the display screen 122 along with other system operation status information as shown in FIG. 2. In an alternative embodiment, there is an LED barograph to quickly allow the driver to visualize the basic status of the roadway and engine retarding system.

Since the controller 110 is programmable, it may also be configured to suggest to the driver that the engine retarder not be switched on, such as in potential ice conditions. This may be accomplished via a text message on the display 120, an alert LED, an audible alarm 165 or any combination of the above.

Figure 4A:
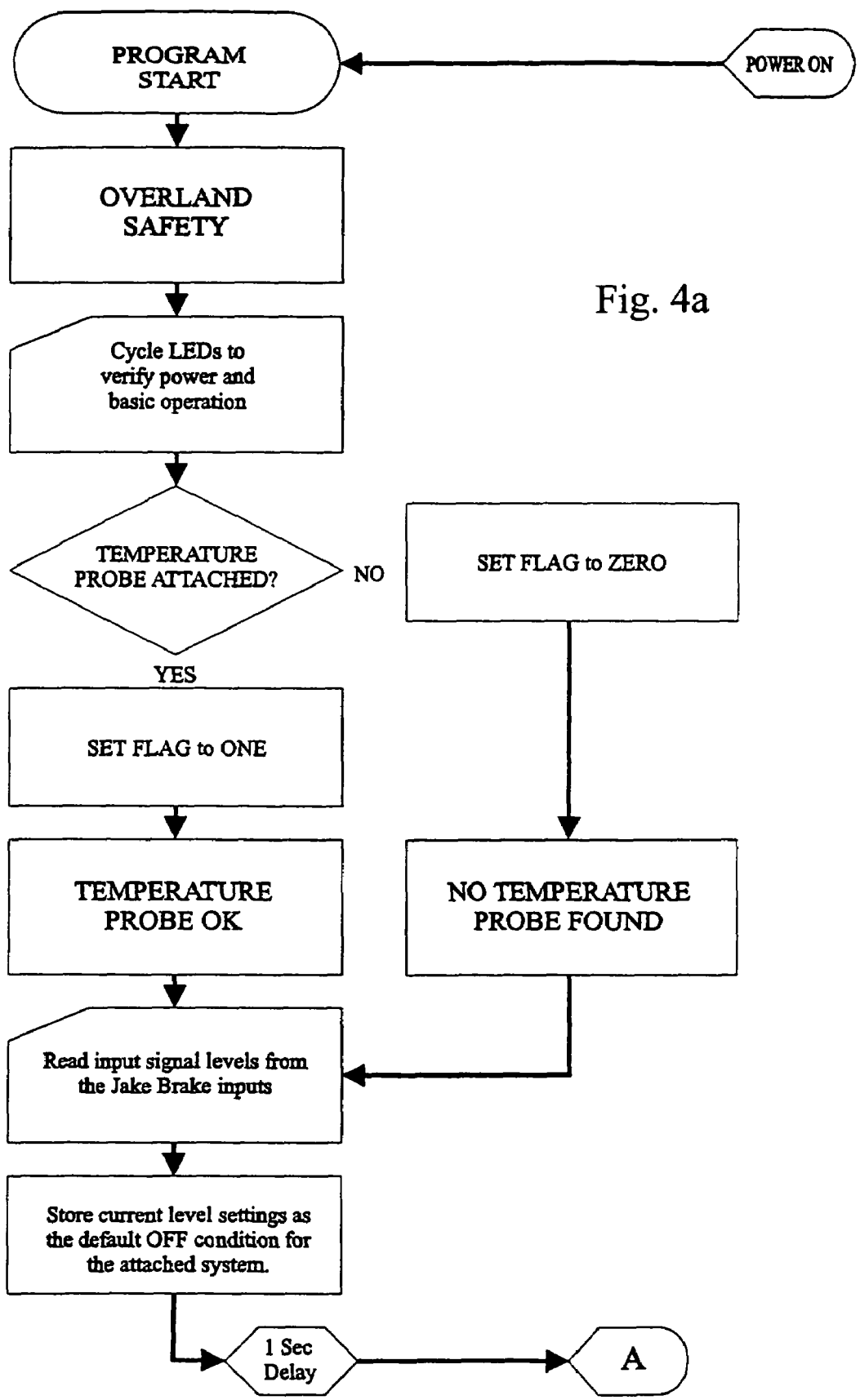
FIGS. 4*a-e* are a flow chart showing an example of implementation of the vehicle safety warning system according to the present invention.

FIGS. 4a through 4e are flow charts showing an example of implementation of the vehicle safety warning system according to the present invention. As shown in FIG. 4a, when power is supplied to the device the warning system completes an initialization check. The displays are cycled to verify operation and the system determines if a temperature probe is connected with the system. If a temperature probe is not detected, a flag is set indicating that a temperature probe was not detected. If a temperature probe is detected, the system continues to read the input from the retardation system and stores the current system settings as default settings. At this point the system is up and running.

After a brief delay, the system again checks the status of the temperature probe and if a temperature probe is detected, determines the road ice condition from a temperature look up table based on the detected temperature. A temperature conversion is completed an the temperature is displayed to the driver using LEDs or a video display as previously described.

Figure 4B:
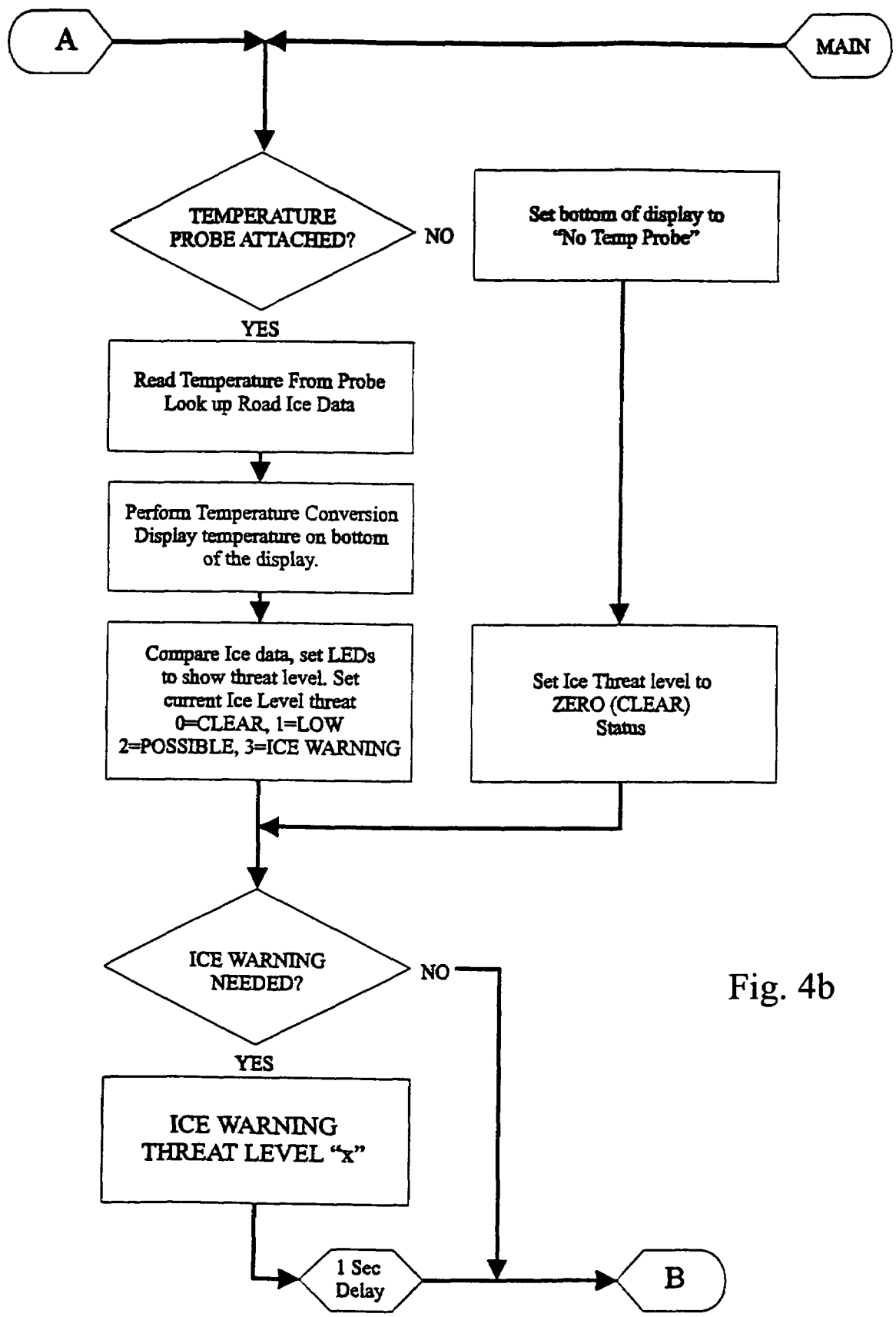

Referring to FIG. 4b, the temperature conversion data is compared to the ice data to determine a threat level. Once the ice level is determined it is used to determine an ice threat. If a threat is not detected, an all clear, problem all clear is displayed to the driver. If an ice threat is detected, an ice warning is displayed to the driver along with a level of the threat. If a low temperature is detected, the threat is a level one because there is a slight chance for ice. If the temperature is near freezing, there is a possible threat of road ice in shaded areas such as areas shaded by trees, buildings, bridges or other structures. If the temperature detected is below freezing, an ice warning is displayed to the driver alerting the driver of potential road ice conditions.

Figure 4C:
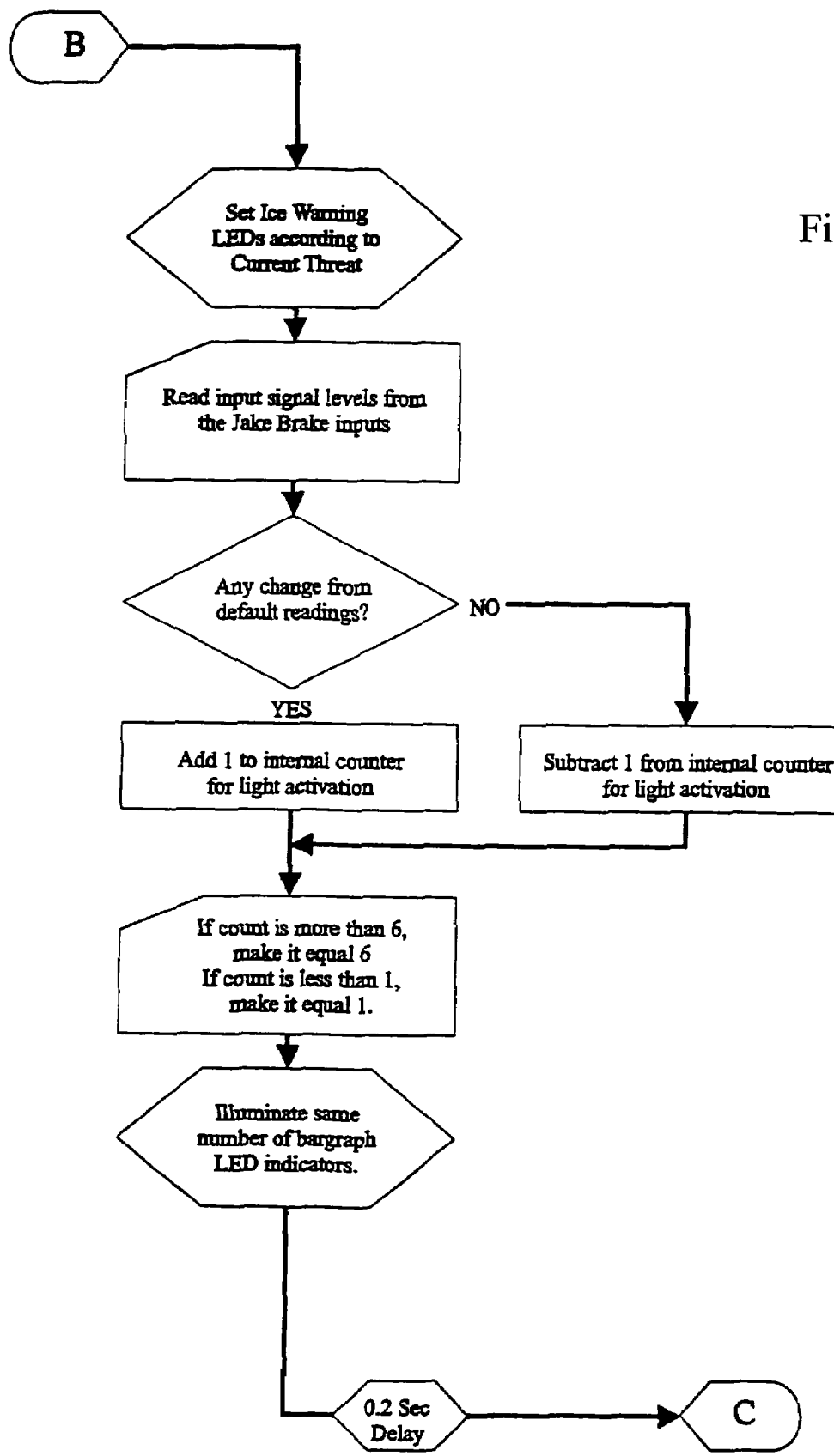

As shown in the flow diagram of FIG. 4c, when an ice warning is detected and the ice warning has been provided to the driver, the controller reads the retardation system input signals to determine if there are any changes. If changes are not detected, an internal counter is decremented and if changes are detected, one is added to the counter. Next the count of the counter is checked and if the count is greater than six, the counter is decreased to six. If the counter is less than one, the count is increased to one. The counter is used to determine the number of LEDs to illuminate on the barograph.

Figure 4D:
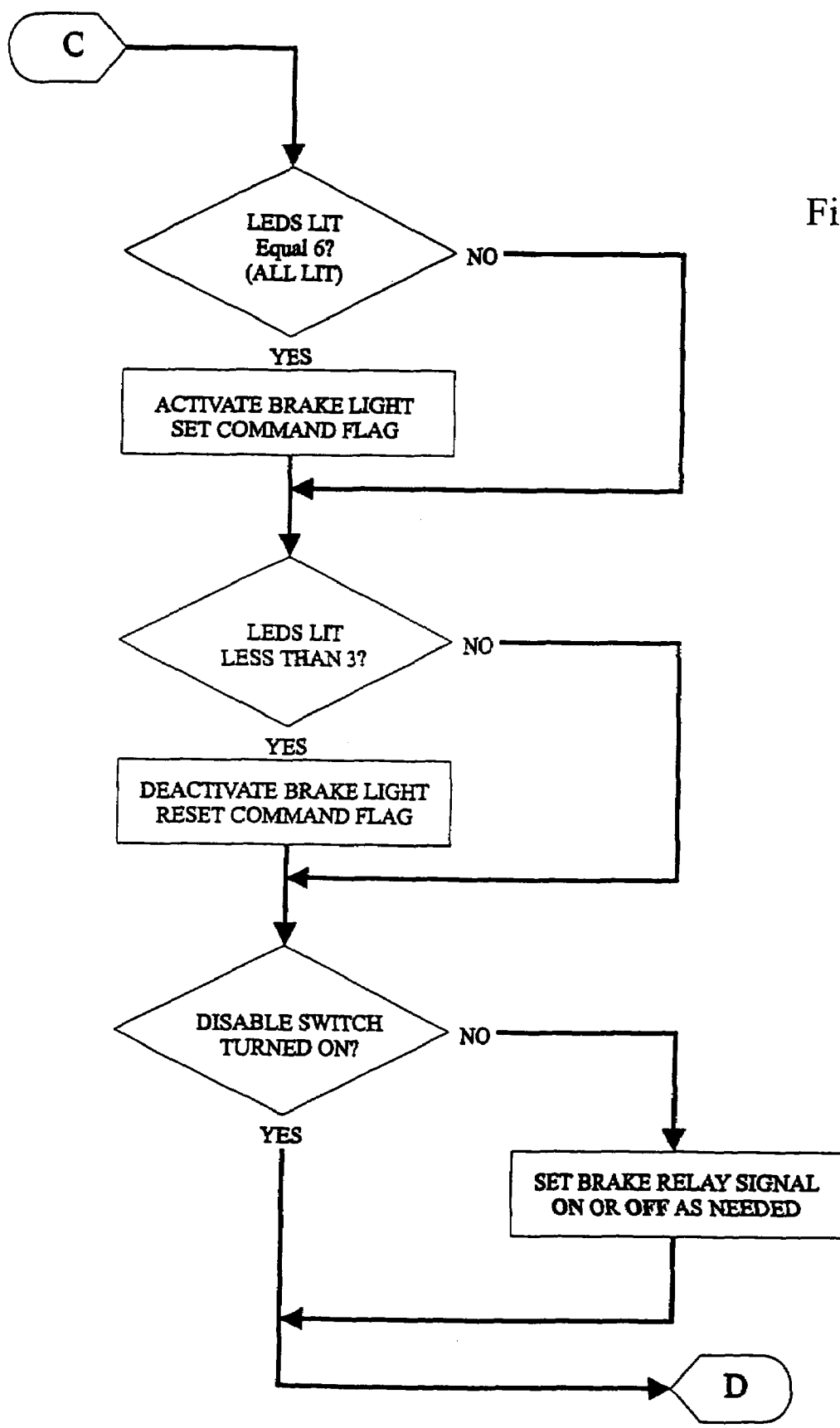

If the counter is equal to six, the brake light command flag is set as shown in FIG. 4d. If the count is less than six the controller determines if the count is less than three. If the count is less than three, the brake light command flag is deactivated and reset. Regardless of the count, the device determines whether or not the disable switch is turned to the ON position and the brake relay signal is set on or off according to the count.

Figure 4E:
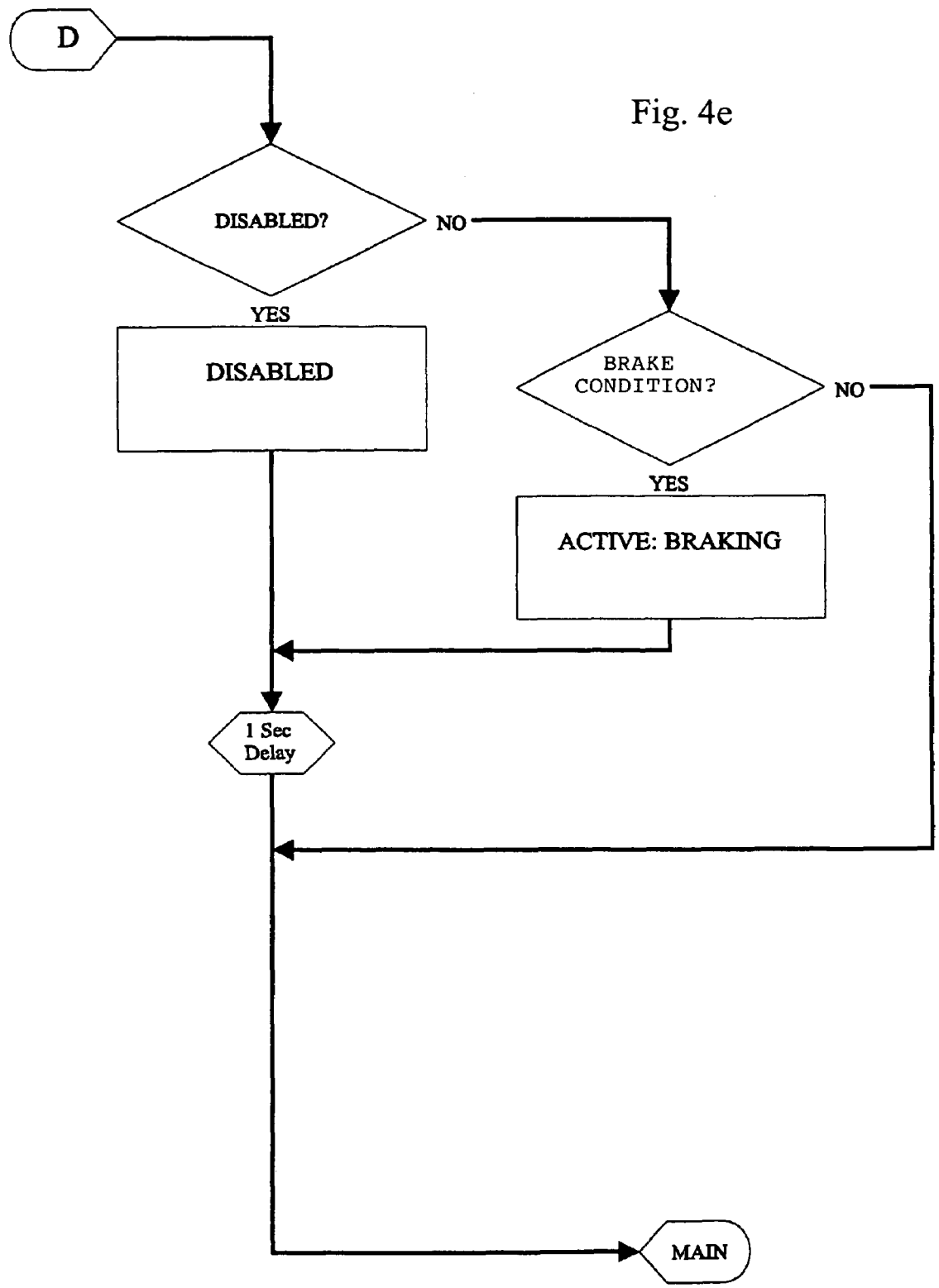

Referring to FIG. 4e, if the disable switch is in the on position, the system determines if the retardation system is disabled. If not disabled, the system checks the brake condition to determine if braking is active. If braking is not active and if the braking system is disabled the system continues checking to determine if a temperature probe is attached as shown in the flow diagram of FIG. 4b. If braking condition is active there is a short delay before the system continues to monitor the temperature readings from the temperature probe as shown in the flow diagram in FIG. 4b.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for providing hazardous road condition warning to a driver of a vehicle and drivers of following vehicles comprising:
   a temperature sensor for sensing an approximate road surface temperature;
   a controller interfaced with the temperature sensor for receiving the sensed road surface temperature to detect a hazardous road condition; and
   an indicator for providing the sensed road surface temperature and hazardous road condition to the driver;
   a tail light interface, wherein when the hazardous road surface condition is detected the controller automatically produces a tail light signal for activating a vehicle tail light to warn drivers traveling behind the vehicle; and
   a vehicle engine retardation system interfaced with the hazardous road condition warning system controller for monitoring the engine retardation system and to display retardation system activity to the driver, wherein responsive to the retardation system being used and hazardous road surface conditions are detected the controller automatically produces the tail light signal.

2. The system of claim 1, wherein the indicator comprises:
   a LED barograph for displaying the sensed road surface temperature; and
   a hazard warning light to warn the driver of hazardous road conditions, wherein the LED barograph and hazard warning light allow the driver to quickly visualize the road surface condition.

3. The system of claim 1, further comprising:
   an audible alarm for alerting the driver when the hazardous road surface condition is detected.

4. The system of claim 1, wherein the indicator comprises:
   a display for displaying the sensed road surface temperature and hazardous road condition warning to the driver.

5. The system of claim 1, further comprising:
   a switch for manually activating and deactivating the system.

6. The system of claim 1, further comprising:
   a tail light control switch for manually activating and deactivating the automatic tail light flashing signal, wherein when the tail light control is deactivated, the controller does not automatically produces a tail light signal for illuminating the vehicle tail light to warn drivers traveling behind the vehicle.

7. The system of claim 1, further comprising:
   a retardation system switch for activating and deactivating the retardation system.

8. The system of claim 5, wherein the controller comprises:
   a processor for executing a set of instructions; and
   a memory for storing the set of instructions and a temperature look up table.

9. The system of claim 8, wherein the set of instructions comprises:
   a first subset of instructions for initializing the system;
   a second subset of instruction for monitoring the road surface temperature to determine if a hazardous condition is detected and providing a status to the driver; and
   a third subset of instructions for monitoring the retardation system and activating and deactivating the tail lights according to the hazardous condition detected.

* * * * *

UNITED STATES PATENT AND TRADEMARK OFFICE
CERTIFICATE OF CORRECTION

| | |
|---|---|
| PATENT NO. | : 7,301,478 B1 |
| APPLICATION NO. | : 11/367994 |
| DATED | : November 27, 2007 |
| INVENTOR(S) | : Gregory F. Chinn, Michael Laughead and John Toman |

Page 1 of 1

It is certified that error appears in the above-identified patent and that said Letters Patent is hereby corrected as shown below:

On The Title Page, replace (73) with:
(73) Assignee: Overland Safety Technologies Corporation, Hollywood, FL (US)

Signed and Sealed this

Twenty Second Day of April, 2008

JON W. DUDAS
*Director of the United States Patent and Trademark Office*